Patented Aug. 22, 1939

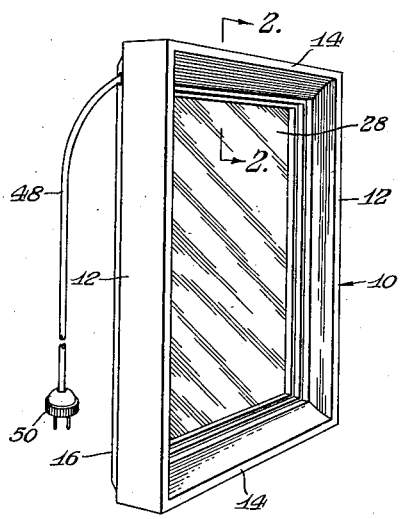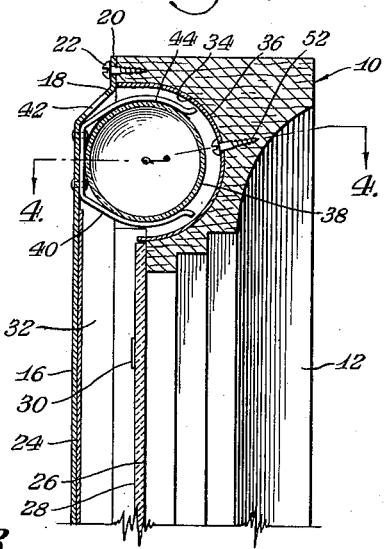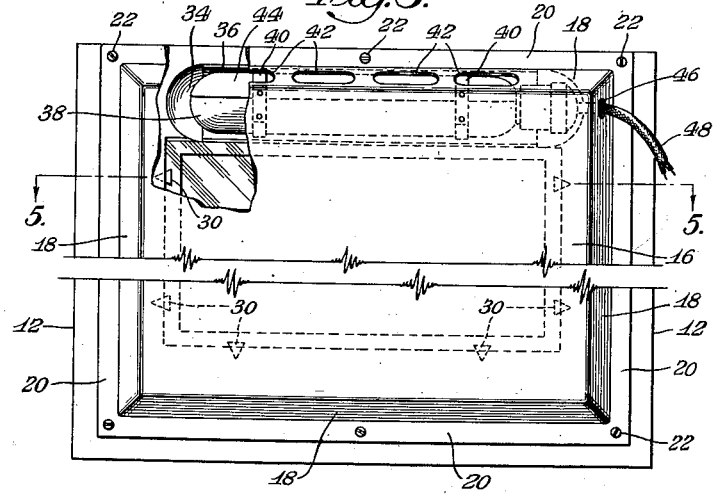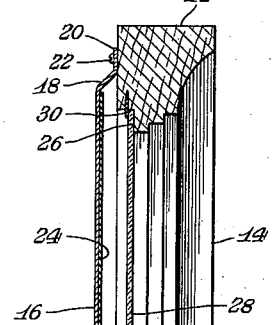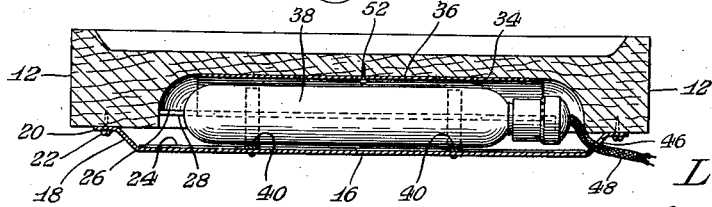

2,170,377

UNITED STATES PATENT OFFICE 2,170,377

PICTURE ILLUMINATION

Louise A. Nisle, Chicago, Ill.

Application December 18, 1936, Serial No. 116,613

3 Claims. (Cl. 240—4)

My invention relates to pictures and the like, and includes among its objects and advantages the provision of improved illumination for the pictures.

An object of my invention is to provide a picture frame embodying illumination for the picture associated therewith in which the illuminating facilities are so arranged as to permit incorporation within picture frames of relatively small proportions in cross section.

A further object is to incorporate illumination within the frame in such a manner as to secure effective indirect illumination of the picture with the lighting facilities hidden from vew and at the same time maintaining the original design and appearance of the frame.

A further object is to provide a novel mounting for the illuminating means in combination with a reflector housed within the contour of the picture frame.

In the accompanying drawing:

Fig. 1 is a perspective view of a picture frame embodying the invention:

Fig. 2 is a sectional view along the line 2—2 of Fig. 1;

Fig. 3 is a fragmentary rear view with certain portions removed for the sake of clearness;

Fig. 4 is a sectional view along the line 4—4 of Fig. 2; and

Fig. 5 is a sectional view along the line 5—5 of Fig. 3.

In the embodiment selected to illustrate my invention, I make use of a picture frame 10 comprising the usual vertical reaches 12 and horizontal reaches 14. In Fig. 2, I illustrate the frame 10 as being provided with a backing plate 16 which is offset at 18 and bent to provide flanges 20 defining the perimeter of the plate. It will be noted that the plate is somewhat pan-shaped so that its greater area lies in spaced relation with the rear face of the reaches 12 and 14. Screws 22 pass through openings in the flanges 20 and are anchored in the reaches 12 and 14 for connecting the backing plate 16 with the frame structure.

Upon the inner face of the backing plate 16 I mount the picture 24 in any suitable manner, as by adhesion. The reaches 12 and 14 are milled to provide shoulders 26 against which I place the glass 28 and secure the glass in position by means of suitable brads 30 pressed into the frame.

Because of the pan-shaped design of the backing plate 16 and the offset relation between the shoulders 26 and the rear face of the reaches 12 and 14, I provide considerable space 32 between the picture 24 and the glass 28. More important, however, is the fact that the space 32 permits effective illumination of the picture 24. To this end I have shown the upper reach 14 as being recessed at 34 for the reception of a reflector 36. An electric lamp 38 is arranged in spaced and concentric relation with the reflector 36. Spring clips 40 are secured to the backing plate 16 for releasably supporting the lamp 38. It will be noted that the lamp 38 projects a considerable distance rearwardly beyond the vertical plane defined by the glass 28 so that light rays will be projected downwardly over the picture 24. The reflector 36 operates to reflect additional light rays upon the picture. Because of the position of the recess 34, the lamp 38 may be substantially housed within the contour of the picture frame. The rear face of the frame is recessed so as not to mar or change the appearance of the front face. The backing plate 16 is so shaped and arranged as to provide not only a mounting for the picture 24 but also an effective support for the lamp 38.

In Figs. 2 and 3, I illustrate the backing plate 16 as being provided with a number of slots 42, which places the space 32 in communication with the atmosphere for air circulation purposes so as to dissipate heat generated by the lamp 38. The lamp 38 may be provided with an opaque area 44 to prevent light rays from passing through the perforations 42. The reflector 36 is fixedly connected with the frame 10 by a screw 52. The backing plate is provided with an opening 46 to provide an outlet for the electric cord 48 associated with the lamp 38. The cord 48 may be provided with a conventional wall plug 50.

While I have illustrated only the upper reach 14 as being provided with one lamp 38, additional lamps may be associated with the reach as when providing illumination for a picture frame of relatively wide proportions. In the same way, the remaining reaches making up the frame 10 may be provided with one or more lamps 38. The lamp illustrated in Fig. 2 is so positioned within its respective reach 14 as to be hidden from view, but the arrangement of the parts is such as to provide effective illumination for the picture.

Without further elaboration, the foregoing will so fully explain my invention that others may, by applying current knowledge, readily adapt the same for use under various conditions of service.

I claim:

1. The combination of a picture frame, a backing plate secured to the rear face of the picture frame, a picture secured to said backing plate, a glass secured to the frame in spaced relation with the picture, said frame being recessed, an electric lamp carried by said backing plate and partly housed within said recess for illuminating the space between the picture and the glass, a reflector positioned within said recess for reflecting light rays in the direction of the picture, said backing plate being provided with an air opening, and an opaque area on said lamp to prevent the projection of light rays through said opening.

2. The combination of a picture frame having a pair of ledges on its rear face, one of said ledges projecting rearwardly beyond the other, the rear face of said frame being provided with a recess, a picture supporting mount anchored to the said one of said ledges, a transparent pane anchored to the said other of said ledges, the picture supporting mount being spaced from and located behind said transparent pane, and an electric lamp mounted within said recess and arranged for illuminating the picture supporting mount.

3. The combination of a picture frame having a pair of ledges on its rear face, one of said ledges projecting rearwardly beyond the other, the rear face of said frame being provided with a recess, a picture supporting mount anchored to the said other of said ledges, the picture supporting mount being spaced from and located behind said transparent pane, an electric lamp mounted within said recess and arranged for illuminating the picture supporting mount, and a reflector mounted within said recess in operative relation with the electric lamp for reflecting light rays rearwardly of the frame and inwardly of the picture supporting mount.

LOUISE A. NISLE.